(12) United States Patent
Iurev

(10) Patent No.: US 11,669,889 B2
(45) Date of Patent: *Jun. 6, 2023

(54) SYSTEM AND METHOD FOR AUTOMATED GENERATION OF MOBILE APPLICATIONS FOR ELECTRONIC SHOPPING

(71) Applicant: Aleksandr Iurev, Krasnogorsk (RU)

(72) Inventor: Aleksandr Iurev, Krasnogorsk (RU)

(*) Notice: Subject to any disclaimer, the term of this patent is extended or adjusted under 35 U.S.C. 154(b) by 36 days.

This patent is subject to a terminal disclaimer.

(21) Appl. No.: 17/075,461

(22) Filed: Oct. 20, 2020

(65) Prior Publication Data

US 2022/0067818 A1   Mar. 3, 2022

Related U.S. Application Data

(60) Provisional application No. 63/070,308, filed on Aug. 26, 2020.

(51) Int. Cl.
| | | |
|---|---|---|
| *G06F 8/65* | (2018.01) | |
| *G06F 8/61* | (2018.01) | |
| *G06Q 30/0601* | (2023.01) | |
| *G06F 9/54* | (2006.01) | |
| *G06F 21/60* | (2013.01) | |

(52) U.S. Cl.
CPC ........... *G06Q 30/0641* (2013.01); *G06F 8/61* (2013.01); *G06F 8/65* (2013.01); *G06F 9/547* (2013.01); *G06F 21/602* (2013.01)

(58) Field of Classification Search
CPC ......... G06Q 30/0641; G06F 8/61; G06F 8/65; G06F 9/547; G06F 21/602
See application file for complete search history.

(56) References Cited

U.S. PATENT DOCUMENTS

| | | | | |
|---|---|---|---|---|
| 8,997,038 | B2* | 3/2015 | Bozek | G06F 8/30 717/106 |
| 9,430,207 | B1* | 8/2016 | Bandhole | H04W 4/50 |
| 10,650,422 | B1* | 5/2020 | Benkreira | G06Q 30/0283 |
| 10,896,066 | B2* | 1/2021 | Huus | G06F 9/505 |
| 2014/0096025 | A1* | 4/2014 | Mandel | H04L 67/10 715/739 |
| 2014/0281884 | A1* | 9/2014 | Burckart | G06F 16/972 715/234 |
| 2015/0188900 | A1* | 7/2015 | Charbonneau | G06F 9/54 726/7 |
| 2016/0119783 | A1* | 4/2016 | Zhao | H04L 9/0822 380/279 |
| 2018/0165067 | A1* | 6/2018 | Duque de Souza | G06F 8/30 |
| 2018/0260195 | A1* | 9/2018 | Govindaraj | G06F 8/35 |
| 2019/0384616 | A1* | 12/2019 | Govindaraj | G06F 9/44505 |
| 2021/0004880 | A1* | 1/2021 | Benkreira | G06Q 30/04 |

* cited by examiner

*Primary Examiner* — Marina Lee

(74) *Attorney, Agent, or Firm* — Law Office of Ilya Libenzon

(57) ABSTRACT

A system and method are provided for generating and seamlessly integrating a mobile application into an e-commerce site. The method includes installing an API module on the e-commerce site, generating a mobile application in accordance with a set of methods, publishing the mobile application in an application store (such as Apple Store, for example) and dynamically updating the mobile application with changes of parameters of the e-commerce site.

20 Claims, 6 Drawing Sheets

INSTALLING ON E-COMMERCE SITE A FIRST API MODULE
610

GENERATING A MOBILE APPLICATION INTEGRATED WITH AND MIRRORING THE E-COMMERCE SITE
620

PUBLISHING THE MOBILE APPLICATION ON AN APPLICATION STORE
630

POPULATING AND DYNAMICALLY UPDATING THE MOBILE APPLICATION AS PARAMETERS OF THE E-COMMERCE SITE CHANGE OVER TIME
640

FIG. 6

SYSTEM AND METHOD FOR AUTOMATED GENERATION OF MOBILE APPLICATIONS FOR ELECTRONIC SHOPPING

CROSS-REFERENCE TO RELATED APPLICATIONS

This application claims the benefit of U.S. provisional patent application No. 63/070,308 filed on Aug. 26, 2020, the content of which is incorporated herein by reference in its entirety.

FIELD OF THE INVENTION

This invention relates generally to the technical filed of electronic shopping, and in various embodiments, to systems and methods for automated generation of mobile applications completely integrated into electronic shopping environment.

BACKGROUND OF THE INVENTION

Electronic commerce (e-commerce) sites are configured to offer for sale a plurality of items and provide virtual shopping carts to facilitate purchase of such items. A user visiting an e-commerce site, or online marketplace, can place one or more items of interested into a virtual shopping cart, and proceed to a checkout process once the user is ready to purchase the times(s) placed in the cart. Once the user has completed the checkout process, the e-commerce site processes the purchase order to obtain payment and ship the purchased order to obtain payment and ship the pur- chased items to the user or hold the purchased items for pick up. In some instances, the owners of e-commerce shops offer their clients to use mobile applications that can be down- loaded to users' mobile devices such as mobile phones, for example. As shown in FIG. 1, a user can interact with e-Commerce shop either through a web browser or by means of a mobile application. The owners of e-shops can either hire a team of developers to build a mobile application that is integrated with the e-shop sites, which is a very compli- cated, lengthy and very expensive process or resort to offering their clients to use commercially-available mobile applications for virtual shopping, which are not completely integrated into e-shopping environment and do not com- pletely comport to the requirements of the e-shopping sites. Additionally, these mobile applications require periodic updates as the parameters of the shopping sites change overtime, which is also a very tedious, complex and expen- sive process. Therefore, there is a need for a system and method for a completely automated generation of mobile applications that are seamlessly integrated into e-shopping environment for any types of e-shops regardless of the underlying platform on which these e-shopping sites are built, and that are configured to dynamically update the mobile applications with the changes of the parameters of e-shopping sites.

SUMMARY OF THE INVENTION

A system and method are provided for generating and seamlessly integrating a mobile application into an e-com- merce site. The method includes installing an application programming interface (API) module on the e-commerce site, generating a mobile application in accordance with a set of methods, publishing the mobile application in an appli- cation store (such as Apple Store, for example) and dynami- cally updating the mobile application with changes of parameters of the e-commerce site. The API module is configured to work as a proxy between the e-commerce site and the mobile application, which is seamlessly integrated with the e-commerce site (i.e., the API module can request, receive and transmit data from e-commerce site) and also configured to dynamically update the mobile application as the parameters of the e-commerce site change over time. The API module is adapted to work with any type of platform on which an e-commerce site is built (Wordpress, Wix, Joomla and the like).

According to one embodiment of the present disclosure, a system for an automated generation of a mobile applica- tion integrated with an e-commerce site includes a first API module configured to be installed on an e-commerce site of a user, and a mobile application integrated with and mirror- ing the e-commerce site and published on an application store. The first API module is configured to work as a proxy between the e-commerce site and the mobile application by establishing communication with a back end/server; the first API module is configured to request, receive and transmit data from the e-commerce site and configured to populate and dynamically update the mobile application as param- eters of the e-commerce site change over time.

The first API module can be adapted to work on any type of platform on which the e-commerce site is built. The first API module can be defined as a set of specifications and as a definition of the structure of response messages in JavaScript Object Notation (JSON) format. In some instances, the first API module can be defined as a set of specifications and as a definition of the structure of response messages in Extensible Markup Language (XML) format.

According to another embodiment of the present disclo- sure, the system can include a second API module config- ured to perform one or more functions. The second API module can receive data from the first API module, decrypt and reconstruct the data and then populate the mobile application with the reconstructed data. In some instances, the first API module is configured to populate one or more pre-built templates of the mobile application with data from the e-commerce site. The first API module can be also configured to expand functionality of the mobile application by adding one or more non-standard features.

A method for automatically generating a mobile applica- tion integrated with e-commerce site is also disclosed in accordance with the present disclosure. The method includes the steps of installing on the e-commerce site a first API module, generating a mobile application integrated with and mirroring the e-commerce site, publishing the mobile appli- cation on an application store; and populating and dynami- cally updating the mobile application as parameters of the e-commerce site change over time.

BRIEF DESCRIPTION OF THE DRAWINGS

The preceding summary, as well as the following detailed description of the disclosed system and method, will be better understood when read in conjunction with the attached drawings. It should be understood, however, that neither the system nor the method is limited to the precise arrangements and instrumentalities shown.

FIG. 6 is a block diagram illustrating a method of the present disclosure for automatically generating a mobile application integrated with e-commerce site.

DETAILED DESCRIPTION OF SPECIFIC EMBODIMENTS

Figure 1:
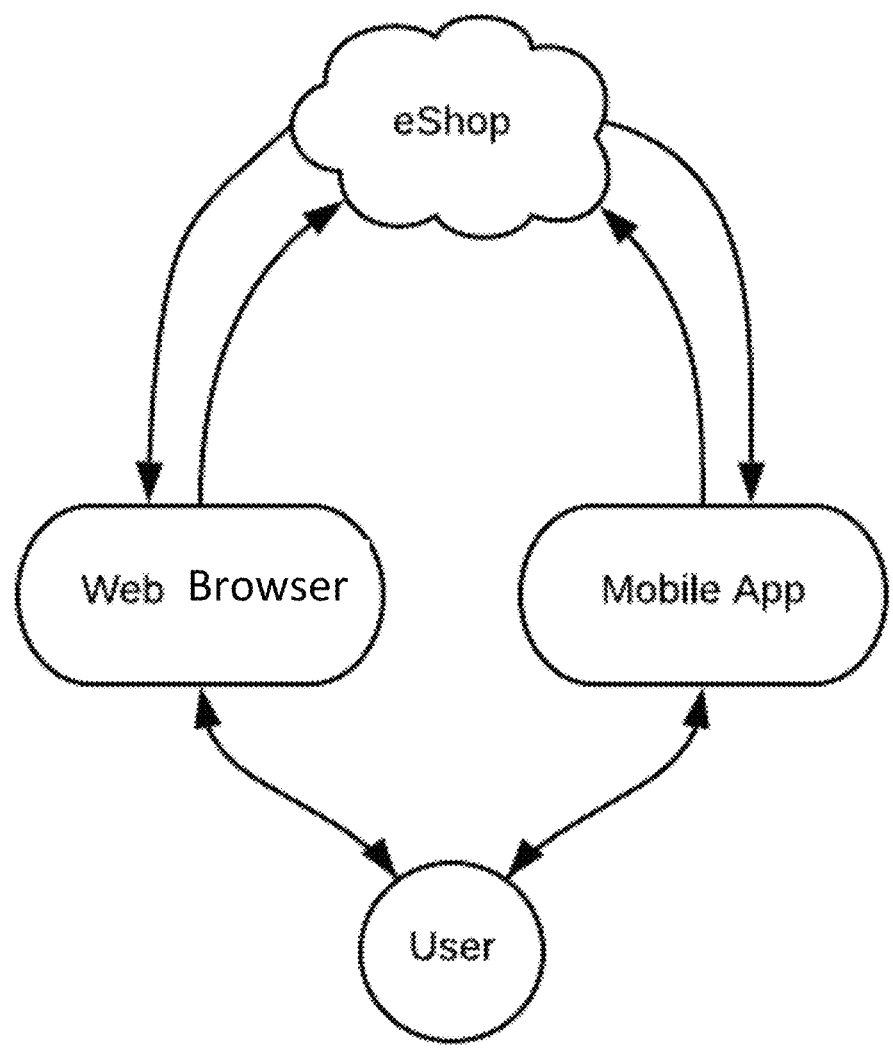
FIG. 1 is a schematic diagram showing a prior art system, illustrating an interaction of a user with an e-commerce shop.
Figure 2:
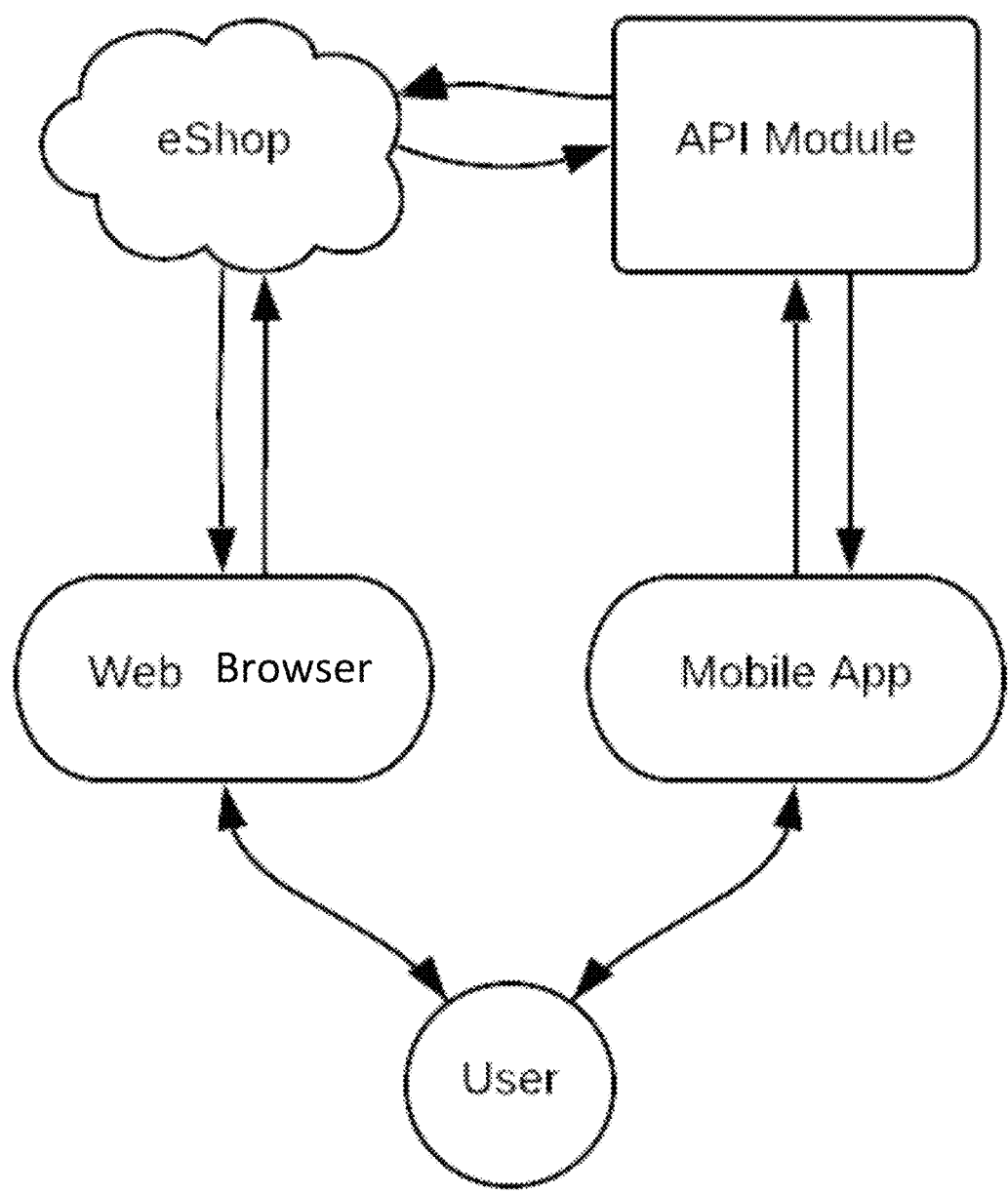
FIG. 2 is a schematic diagram showing a system illus- trating an interaction of a user with an e-commerce shop in accordance with the present invention.

A system and related methods for a completely automated generation of a mobile application integrated with an e-commerce site are provided. The system of the present disclosure is illustrated in a schematic diagram of FIG. 2. According to the present invention, an API module is installed on an e-commerce site of an e-shop owner. Then a mobile application is generated, which is completely integrated with the e-commerce site i.e., it mirrors the e-commerce site, and is published on Application Store (such as Apple Application Store, for example) bearing the owner's logo and description of e-shop. The API module is configured to work as a proxy between the e-commerce site and the mobile application, which is seamlessly integrated with the e-commerce site (i.e., the API module can request, receive and transmit data from e-commerce site) and also configured to populate and dynamically update the mobile application as the parameters of the e-commerce site change over time. The API module is adapted to work with any type of platform on which an e-commerce site is built (Wordpress, Wix, Joomla and the like).

Figure 3:
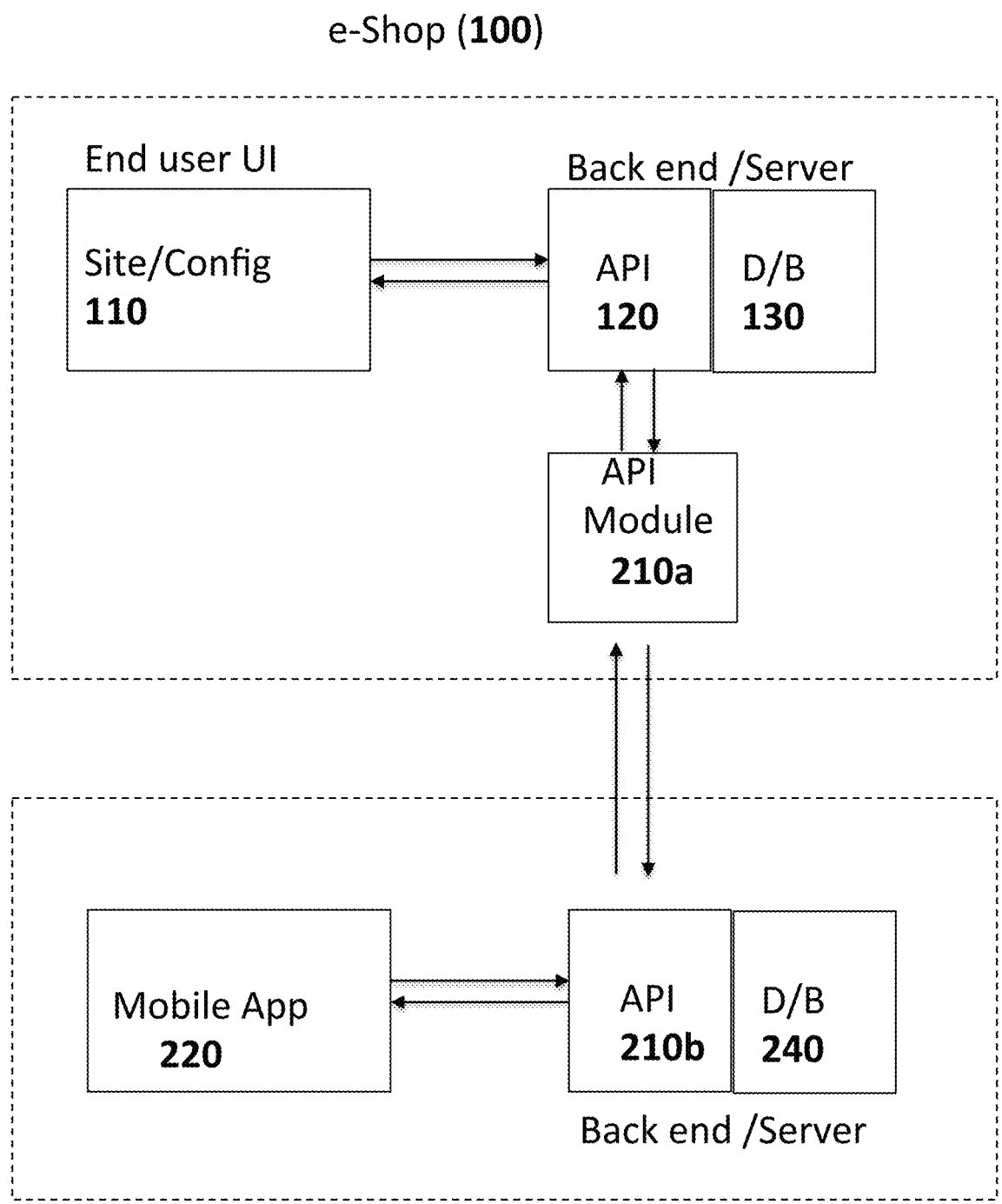
FIG. 3 is a schematic diagram illustrating a system for generating a mobile application in accordance with the present disclosure.

As shown in more detail in FIG. 3, the API Module 210*a* is installed on the e-commerce site for establishing communication with the back end/server through API 120. The API Module 210*a* is configured to request, receive and transmit data from the e-commerce site (through the API 120) to API 210*b* for generation of a mobile application 220. The API module is defined as a set of specifications and a definition of the structure of response messages, preferably in JavaScript Object Notation (JSON) format, or in some instances, in Extensible Markup Language (XML) format, or in any other suitable formats. The API Module 210 is configured to be added to an e-Commerce site, and to request, receive and transmit data to generate and dynamically update a mobile application 220 with the changes in the parameters or structure of the e-Commerce site. According to some embodiments of the present invention, the API Module (210*a*) can be in communication with another API Module (210*b*), configured to perform various functions. For example, in some instances, the API module 210*a* can be configured to authenticate and get data from the API 120 of the e-commerce site and then send the data to the API module 210*b*, which in turn is configured to decrypt and reconstruct data and then populate mobile application with the reconstructed data as shown in FIG. 3. According to another embodiment of the present disclosure, API Module 210*a* can be configured to communicate with Mobile App 220 directly, without the intermediary API 210*b* (it can authenticate and get data from API 120 of the e-commerce site and then decrypt, reconstruct and send the data to the mobile application 220). According to some methods of the present invention, the API module 210 can populate a pre-built template mobile application having standard functionalities with the data from the e-shop. In some other instances, the API module 210 can expand functionality of a mobile application by adding non-standard features. For example, a standard template mobile application is pre-fabricated to have a plurality of fields with the standard e-shop properties/functions such as products, prices, delivery methods, description of services and so forth. The API module is configured to get the corresponding data from the e-commerce site and populate these standard fields of the template mobile application. However, in some instances, an ecommerce site could have one or more non-standard custom-made features, which can also be added to a mobile application thereby expanding the functionality of the pre-built mobile application template.

Exemplary Set of Methods for Mobile Application Generation

| Authorization (registration, login, security token) |
| --- |

```
/registration:
   post:
     tags:
        - unauthorized
     parameters:
        - in: query
           name: fields
           required: true
           schema:
              $ref: '#/components/schemas/UserReg'
     responses:
        '200':
           description: 'will return token in case of success'
           content:
              application/json:
                 schema:
                    type: string
                    example: 'Token : s1morf609228iwyjjpvfv6wsvuja4p8u'
        '400':
           description: 'Registration error'
           content:
              application/json:
                 schema:
                    type: string
                    example: 'Password must contain more than 6 symbols'
```

```
/login:
  post:
    tags:
      - unauthorized
    parameters:
      - in: query
        name: LOGIN
        required: true
        schema:
          type: string
      - in: query
        name: PASSWORD
        required: true
        schema:
          type: string
    responses:
      '200':
        description: 'return token in case of success'
        content:
          application/json:
            schema:
              type: string
              example: 's1morf609228iwyjjpvfv6wsvuja4p8u'
      '400':
        description: return authorization error'
        content:
    application/json:
          schema:
            type: string
            example: 'Wrong login or password'
/logout:
  post:
    security:
      - Token: [ ]
    tags:
      - authorized
    parameters:
      - in: header
        name: Token
        required: true
        schema:
          type: string
          example: 'Token: s1morf609228iwyjjpvfv6wsvuja4p8u'
    responses:
      '200':
        description: 'user logged out'
      '401':
        description: 'user is not authorized'
        content:
          application/json:
            schema:
              type: string
              example: 'User is not authorized'
/user:
  get:
    security:
      - Token: [ ]
    tags:
      - authorized
    parameters:
      - in: header
        name: Token
        required: true
        schema:
          type: string
          example: 'Token: s1morf609228iwyjjpvfv6wsvuja4p8u'
    responses:
      '200':
        description: 'return an array of user fields'
        content:
          application/json:
            schema:
              $ref: '#/components/schemas/User'
      '401':
        description: 'user is not authorized'
        content:
          application/json:
            schema:
              type: string
```

```
            example: 'User is not authorized'
    put:
      security:
        - Token: [ ]
      tags:
    - authorized
      parameters:
        - in: header
          name: Token
          required: true
          schema:
            type: string
            example: 'Token: s1morf609228iwyjjpvfv6wsvuja4p8u'
      requestBody:
        required: true
        content:
          application/json:
            schema:
              $ref: '#/components/schemas/User'
      responses:
        '200':
          description: 'user's data has been changed successfully'
        '400':
          description: 'update error'
          content:
            application/json:
              schema:
                type: string
                example: 'The password must contain more than 6 symbols'
        '401':
          description: 'user is not authorized'
          content:
            application/json:
              schema:
                type: string
                example: 'User is not authorized'
```

Get Products

```
products:
  get:
    parameters:
      - in: query
        name: filter
        description: 'Array for filtering products. Constructed from the field of products. The following operators can be used (<,<=,>,>=, !, ><). For example, products in the category with SECTION_ID = 3 will look like filter[SECTION_ID]=3'
        schema:
          type: string
          example: 'filter[SECTION_ID]=3'
      - in: query
        name: sort
        description: 'Array for filtering products. Filtering by name, date of creation, and other fileds., in ascending and descending order. For example.'
        schema:
          type: string
          example: 'sort[SORT]=asc'
      - in: query
        name: page
        description: 'Page number for pagination. By default equal to 1'
        schema:
          type: integer
          example: 1
      - in: query
        name: offset
        description: 'Number of products on one page. By default equal to 100'
        schema:
          type: integer
          example: 100
    description: 'return an entire list of products'
    responses:
      '200':
        description: 'in case of success, return an entire list of products '
        content:
          application/json:
            schema:
              type: object
              properties:
```

```
                TOTAL_COUNT:
                  type: integer
                  example: 3290
                CURRENT_PAGE:
                  type: integer
                  example: 2
                OFFSET:
                  type: integer
                  example: 100
                PRODUCTS:
                  type: object
                    # $ref: '#components/schemas/Product'
      '404':
        description: 'if products are not found'
        content:
          application/json:
            schema:
              type: string
              example: 'Products not found'
/products/{productID}:
  get:
    description: receive product with productID'
    parameters:
      - in: path
        name: productID
        required: true
        schema:
          type: integer
          example: 47
    responses:
      '200':
        description: 'receive product'
        content:
          application/json:
            schema:
              items:
                $ref: '#/components/schemas/Product'
      # '400':
      #   description: 'productid is not defined'
      #   content:
      #     application/json:
      #       schema:
      #         type: string
      #         example: 'Invalid ID'
      '404':
        description: 'product not found'
        content:
          application/json:
            schema:
              type: string
              example: 'Product with {productID} not found'
/basket:
  post:
    security:
      - Token: [ ]
    tags:
      - authorized
    description: add product to a basket'
    requestBody:
      required: true
      content:
        application/json:
          schema:
            type: object
            properties:
              productId:
                type: integer
                example: 47
              quantity:
                type: integer
                example: 2
    responses:
      '200':
        description: 'product added successfully'
      '401':
        description: 'user is not authorized'
        content:
          application/json:
            schema:
```

```
                    type: string
                    example: 'User is not authorized'
      get:
        security:
          - Token: [ ]
        tags:
          - authorized
        description: 'get basket
        responses:
          '200':
            description: 'get user's basket or empty array'
            content:
              application/json:
                schema:
                  $ref: '#/components/schemas/Basket'
```

In accordance with some embodiments of the present invention, the owner of the e-commerce shop downloads and installs an API module on the e-commerce site, upon paying a subscription fee. Soon thereafter, a mobile application mirroring the owner's e-commerce site is generated and published on an application store, such as Apple AppStore, for example. Then, the owner of the e-commerce shop can download and use this mobile application on a mobile device, such as mobile phone, for example. When the owner of the e-shop makes any changes on the e-commerce site (adds a new item for sale, for example), the mobile application is updated accordingly without any delays. Likewise, a user of an e-commerce site can access it directly through a web browser or can download and install a mobile application on a mobile device such a mobile phone, for example and use it in exactly the same way as the e-commerce website, because the mobile application is seamlessly integrated with the e-commerce site (i.e., it provides exactly the same functionality, and bears logo, description and any other relevant up-to-date information).

As illustrated in FIG. 6, a method for automatically generating a mobile application integrated with e-commerce site includes installing on the e-commerce site a first API module (step 610), generating a mobile application integrated with and mirroring the e-commerce site (step 620), publishing the mobile application on an application store (step 630), and populating and dynamically updating the mobile application as parameters of the e-commerce site change over time using the first API module (step 640).

Figure 4:
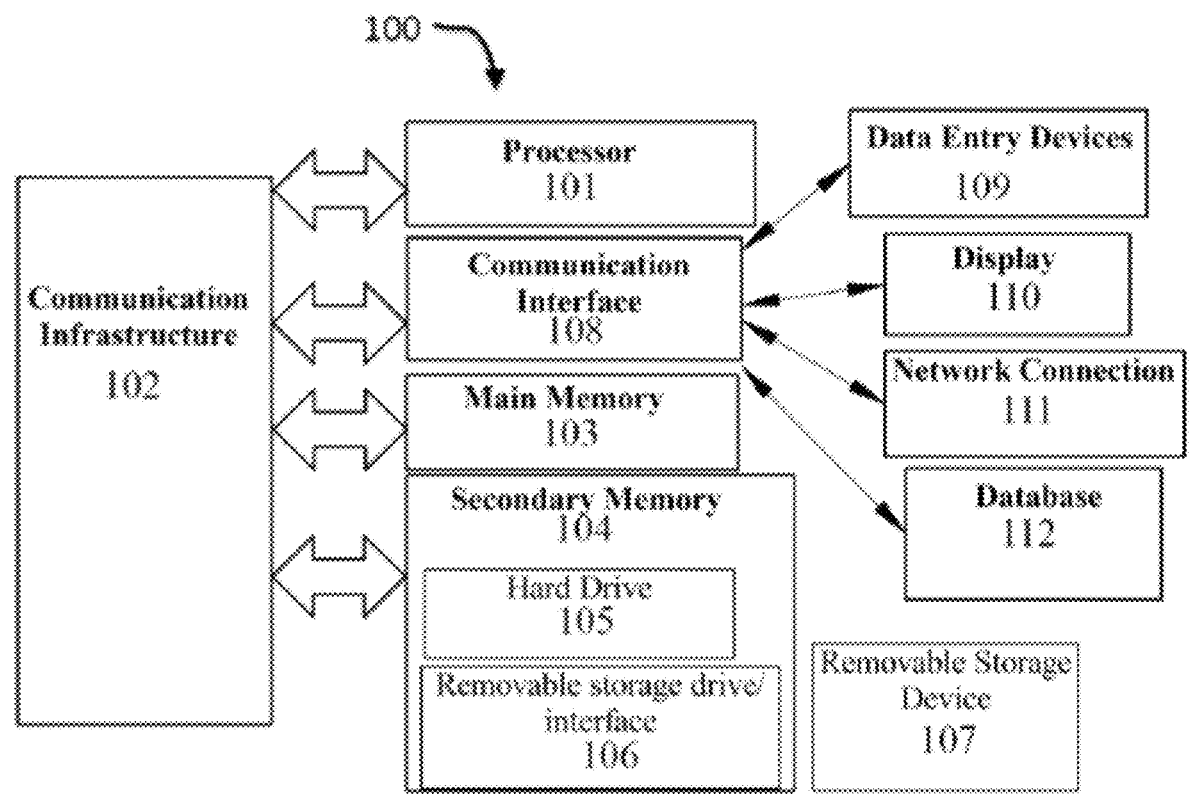
FIG. 4 is a block diagram depicting an example of a computing device as described herein.

Some embodiments of the disclosed system and methods will be better understood by reference to the following comments concerning computing devices. A "computing device" 100 may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general. An exemplary computing device is illustrated by FIG. 4. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system. Where embodiments are implemented using software, the software may be stored in a computer program product and loaded into the computing device using a removable storage drive or interface 106, a hard disk drive 105, or a communications interface 108.

Computer program code for carrying out operations of the present invention may be written in an object oriented programming language such as, but not limited to, Java, Smalltalk or C++. However, the computer program code for carrying out operations of the present invention may also be written in conventional procedural programming languages such as the "C" programming language. Computer readable program instructions for carrying out operations of the present invention may also be assembler instructions, instruction-set-architecture (ISA) instructions, machine instructions, machine dependent instructions, microcode, firmware instructions, state-setting data, or either source code or object code written in any combination of one or more programming languages described above. In some instances, the computer readable program can be executed in the reverse order, depending upon the functionality involved. It will also be noted that each block of the flowchart illustrations, and combinations of blocks in the flowchart illustrations, can be implement by special purpose hardware-based systems that perform the specified functions or acts or carry out combinations of special purpose hardware and computer instructions.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The computing device 100 may employ one or more security measures to protect the computing device 100 or its data. For instance, the computing device 100 may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext may be unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Figure 5:
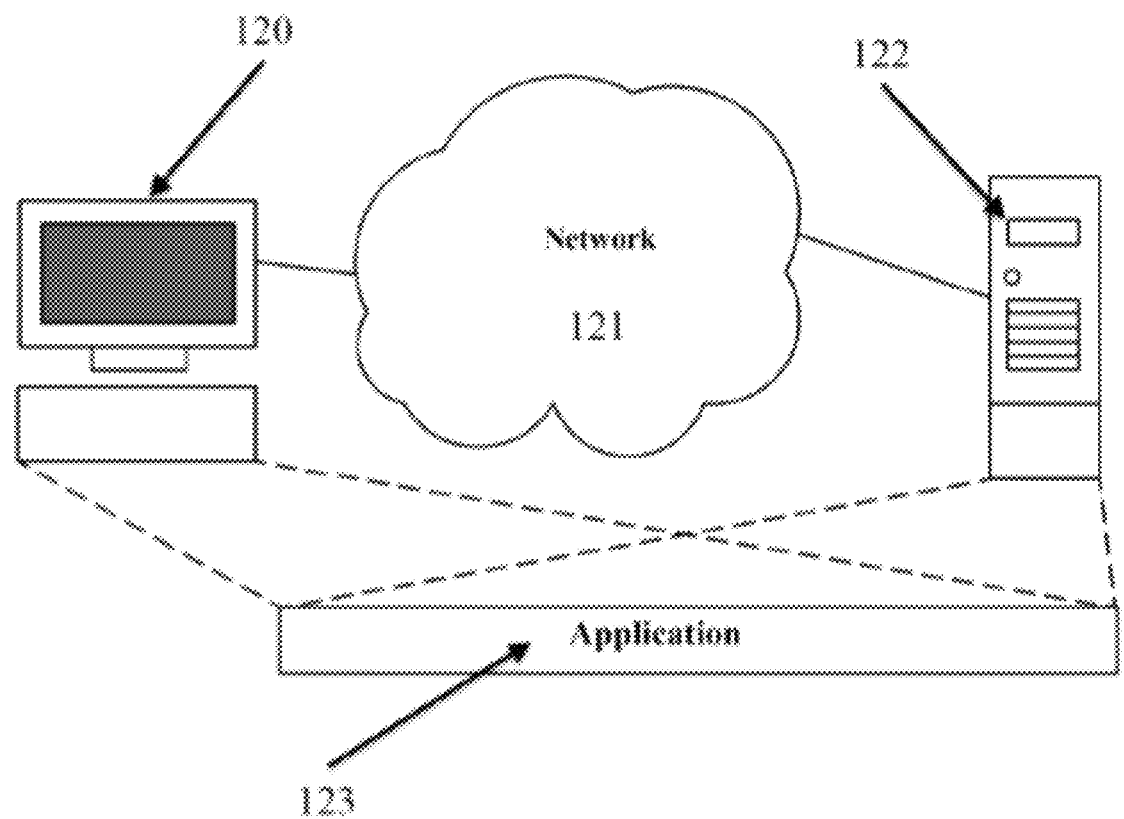
FIG. 5 is a block diagram depicting an example of a network-based platform, as described herein.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 5. Web application platforms typically include at least one client device 120, which is a computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also a computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause a computing device to operate as a web application client 120. Thus, as a general matter, web applications 123 require some computer program configuration of both the client device (or devices) 120 and the server 122. The computer program that comprises the web application component on either computing device's system FIG. 4 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

The one or more client devices 120 and the one or more servers 122 may communicate using any protocol according to which data may be transmitted from the client 120 to the server 122 and vice versa. As a non-limiting example, the client 120 and server 122 may exchange data using the Internet protocol suite, which includes the transfer control protocol (TCP) and the Internet Protocol (IP), and is sometimes referred to as TCP/IP. In some embodiments, the client and server 122 encrypt data prior to exchanging the data, using a cryptographic system as described above. In one embodiment, the client 120 and server 122 exchange the data using public key cryptography; for instance, the client and the server 122 may each generate a public and private key, exchange public keys, and encrypt the data using each others' public keys while decrypting it using each others' private keys.

In some embodiments, the client 120 authenticates the server 122 or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum.

The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publically available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority, and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server 122 and client 120 may communicate using a security combining public key encryption, private key encryption, and digital certificates. For instance, the client 120 may authenticate the server 122 using a digital certificate provided by the server 122. The server 122 may authenticate the client 120 using a digital certificate provided by the client 120. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client 120 and the server 122; for instance, the secret may be a private key for a private key cryptographic system. The secret may be a datum from which the private key may be derived. The client 120 and server 122 may then use that private key cryptographic system to exchange information until the secure communication protocol in which they are communicating ends. In some embodiments, this handshake and secure communication protocol is implemented using the secure sockets layer (SSL) protocol. In other embodiments, the protocol is implemented using the transport layer security (TLS) protocol. The server 122 and client 120 may communicate using hyper-text transfer protocol secure (HTTPS).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A system for an automated generation of native mobile applications integrated with an e-commerce site comprising:
   a first application programming interface (API) module operatively connected to the e-commerce site of a user;
   a native mobile application integrated with and replicating attributes of the e-commerce site and published on an application store, wherein the first API module working as a proxy between the e-commerce site and the native mobile application in a two-way communication with a back end/server of the e-commerce site; and
   one or more processors and one or more memories having stored thereon instructions that, when executed by the one or more processors, cause the first API module to:
   request, receive, and transmit data from the e-commerce site and from the native mobile application; and
   populate and dynamically update the native mobile application and the e-commerce site as parameters of the e-commerce site or the native mobile application or both change over time.

2. The system according to claim 1, wherein the first API module is adapted to work on any type of platform on which the e-commerce site is built.

3. The system according to claim 1, wherein the first API module is defined as a set of specifications and as a definition of the structure of response messages in JavaScript Object Notation (JSON) format.

4. The system according to claim 1, wherein the first API module is defined as a set of specifications and as a definition of the structure of response messages in Extensible Markup Language (XML) format.

5. The system according to claim 1, further comprising a second API module, wherein the execution of the instructions by the one or more processors cause the second API module to perform one or more functions.

6. The system according to claim 5, wherein the execution of the instructions by the one or more processors cause the second API module to receive data from the first API module, decrypt and reconstruct said data and then populate the native mobile application with the reconstructed data.

7. The system according to claim 1, wherein the execution of the instructions by the one or more processors cause the first API module to populate one or more pre-built templates of the native mobile application with data from the e-commerce site.

8. The system according to claim 1, wherein the execution of the instructions by the one or more processors cause the first API module to expand functionality of the native mobile application by adding one or more non-standard features.

9. The system of claim 5, wherein the execution of the instructions by the one or more processors cause the second API module to populate one or more pre-built templates of the native mobile application with data from the e-commerce site.

10. The system of claim 5, wherein the execution of the instructions by the one or more processors cause the second API module to expand functionality of the native mobile application by adding one or more non-standard features.

11. A method for automatically generating native mobile applications integrated with an e-commerce site, said method comprising:
  installing on the e-commerce site a first application programming interface (API) module;
  generating a native mobile application integrated with and replicating attributes of the e-commerce site;
  establishing a two-way communication of the native mobile application with a back end/server of the e-commerce site via the first API module;
  publishing the native mobile application on an application store; and
  populating and dynamically updating the native mobile application and the e-commerce site as parameters of the e-commerce site or the native mobile application or both change over time using the first API module.

12. The method of claim 11, wherein the first API module working as a proxy between the e-commerce site and the native mobile application by establishing communication with a back end/service.

13. The method of claim 11, further comprising requesting, receiving, and transmitting data from the e-commerce site using the first API module.

14. The method of claim 11, wherein the first API module is adapted to work on any type of platform on which the e-commerce site is built.

15. The method of claim 11, wherein the first API module is defined as a set of specifications and as a definition of the structure of response messages in JavaScript Object Notation (JSON) format.

16. The method of claim 11, wherein the first API module is defined as a set of specifications and as a definition of the structure of response messages in Extensible Markup Language (XML) format.

17. The method of claim 11, wherein the first API module is configured to communicate with a second API module.

18. The method of claim 17, further comprising receiving data from the first API module, decrypting and reconstructing data and then populating the native mobile application with the reconstructed data using the second API module.

19. The method of claim 11, wherein the populating and dynamically updating the native mobile application comprises populating one or more pre-built templates of the mobile application with data from the e-commerce site.

20. The method of claim 11, wherein the populating and dynamically updating the native mobile application comprises expanding functionality of the native mobile application by adding one or more non-standard features.

* * * * *